UNITED STATES PATENT OFFICE.

HOWARD F. WEISS, OF MADISON, WISCONSIN, ASSIGNOR TO C. F. BURGESS LABORATORIES, OF MADISON, WISCONSIN, A CORPORATION OF WISCONSIN.

TREATMENT OF WOOD AND RECOVERY OF ORGANIC PRODUCTS THEREFROM.

1,358,129.  Specification of Letters Patent.  Patented Nov. 9, 1920.

No Drawing.  Application filed May 14, 1918. Serial No. 234,523.

*To all whom it may concern:*

Be it known that I, HOWARD F. WEISS, a citizen of the United States, residing at Madison, in the county of Dane, State of Wisconsin, have invented certain new and useful Improvements in the Treatment of Wood and Recovery of Organic Products Therefrom; and I do hereby declare the following to be a full, clear, and exact description of the invention, such as will enable others skilled in the art to which it appertains to make and use the same.

This invention relates to the treatment of the wood of the western larch for the production of paper pulp, and the recovery of organic products therefrom prior to the pulp-making operation.

The wood of the western larch contains very considerable amounts of organic matter which is soluble in water, and which exerts a modifying influence upon the pulp-making process, when this wood is treated, in accordance with the usual processes, for the production of chemical pulp, as by the soda sulfate or sulfite processes.

According to the present invention, the objections incident to the presence of the soluble constituents of the larch during the chemical pulp process are obviated or minimized, and, at the same time, there is recovered from the wood of the larch the important soluble constituents contained therein, in a form which makes them readily available for use and for further treatment.

The invention will be further described, and will be more fully illustrated, by the following more detailed description of one embodiment thereof.

The wood of the western larch is mechanically chipped or shredded in a manner similar to that commonly practised in the mechanical reduction of wood for the soda sulfate or sulfite process. By this mechanical reduction, the wood is prepared, mechanically, for the subsequent chemical pulp process; but it is at the same time prepared in a form particularly advantageous for the extraction therefrom of its soluble constituents.

The chipped, shredded, or finely comminuted wood is then leached for the extraction therefrom of the soluble constituents. This leaching may be carried out in various ways. A charge of the finely divided wood may be separately treated either by digestion, or by systematic leaching. The digester in which the pulp-making operation is to be carried out may thus be filled with the charge of finely divided wood, and the leaching liquor introduced into the digester, and the digester heated until the solution becomes saturated, or until the extraction has continued for the desired period of time. The extract thus obtained may be used for extracting further batches of the finely divided wood, and its content of soluble constituents thereby increased. For example, the partly saturated solution may be used for the first extraction of a fresh charge, and the extraction by this partly saturated liquor may be followed by extraction with more dilute liquor or with fresh water.

The extraction may also, with advantage, be carried out on the counter-current principle, that is, by circulating the same liquor progressively through a series of charges of the finely-divided wood so that the fresh water or aqueous liquor first comes in contact with the wood which has been more nearly extracted, and the fresh charges of wood first come into contact with the liquor already partly saturated with the soluble constituents.

This systematic leaching or extraction may be carried out, for example, in a series or battery of digesters, in which the finely divided wood is to be subsequently treated chemically for the production of the chemical pulp. The common forms of pulp digesters are available for use for this purpose, provided they are suitably connected for the control and regulation and circulation of the extracting liquor therethrough in the desired manner. Such pulp digesters are moreover commonly provided with heating means, either in the form of a heating jacket or coil, or a pipe or coil for admitting steam directly into the digester, and such heating means are of advantage in enabling the extracting liquor to be maintained at an elevated temperature during the extraction.

The extraction may also be carried out in a systematic and progressive manner in a series or battery of diffusion cells, such as is commonly known in the art as a diffusion battery, and which is illustrated, for example, in the extraction of sugar beets.

As a result of the extraction of the finely divided wood, the amount of extracted constituents can be increased to the desired extent, and a solution obtained of a sufficient concentration to make possible the utilization thereof for the recovery of the organic products contained therein or producible therefrom.

The extract obtained from the wood of the western larch consists very largely of galactan. The amount of extractable material, principally galactan, may amount to as much as about 300 pounds per ton of larch; but this may be very materially increased if the wood is preliminarily steamed or if the extraction is carried out at an elevated temperature.

In case the extract which contains the galactan and other extracted constituents also carries with it finely divided wood the finely divided wood in suspension may be removed by filtration or otherwise, and a clear solution thereby obtained.

The strength of the solution, as above pointed out, may be regulated and increased, and thereby brought to the proper or desired concentration for the particular purposes for which it is desired. The solution may, moreover, be further concentrated by evaporation to give a more concentrated liquor, or a syrup, or a dry product.

As the result of the extraction of the finely divided wood, not only is the valuable extractable matter, principally galactan, obtained in a valuable form, but the finely divided wood itself is correspondingly freed from the extracted constituents, and the wood is itself given a preliminary treatment which is advantageous for the subsequent pulp-making process.

After the extraction of the wood, to the desired extent, the finely divided wood is then ready for chemical treatment, for the production of chemical pulp, and may then be treated with the chemical liquor in the manner commonly practised in the production of paper pulp but with the advantages to the pulp process such as those referred to above. In case the extraction of the finely divided wood has been carried out in the digester, and the extract removed, the chemical liquor may be then directly introduced and the pulp process carried out in much the usual manner. Thus, in the sulfite process, the sulfite liquor so called, may be introduced and the digestion carried out at the proper temperature and for the proper time to convert the wood into the desired pulp or paper stock.

In the case of the soda or sodium sulfate process, the liquor will be similarly introduced and the digestion carried on in a similar or corresponding manner.

Inasmuch as the soluble constituents have been to a greater or less extent removed from the finely divided wood, the digestion process will take place without the introduction into the liquor of the large amount of galactan, etc., which would be extracted by the chemical liquor if the finely divided larch were digested without the preliminary extraction.

The present invention, accordingly, may be considered to involve two different features of importance and of advantage, which are to a certain extent interdependent and cumulative, namely—the extraction of the valuable constituents of the larch from the finely divided wood which is in a form well adapting it for extraction and the resulting recovery of these valuable constituents in a form adapting them for immediate use or further treatment; and the advantage to the pulp-making process of preliminarily preparing and treating the finely divided wood and of removing therefrom constituents which would otherwise be present and modify the pulp-making process. The chemical pulp-making process is thus promoted by the fact that the wood is made more porous and is thereby put into better condition for the chemical treatment, as well as by the fact that less chemical reagents are required, with resulting economy therein, while the pulp produced is of better quality than when the wood is treated without the preliminary extraction.

It will be evident also, that the waste liquor obtained at the end of the pulp-making process, will be correspondingly modified by the preliminary removal of the soluble constituents before the digestion. In the case of the sulfite process, the waste sulfite liquor obtained after separation of the pulp will contain much less of the galactan or its conversion products than would be the case if all the galactan were present during the sulfite digestion. The recovery of certain constituents from the waste liquor, whether from the sulfite or soda or sulfate process, will moreover be promoted or modified by the absence from the waste liquor of the galactan or its conversion products which would be present if the wood were not extracted prior to the digestion.

The galactan solution obtained may be used for various purposes. It may be recovered in a dry form, as by evaporation, or it may be converted into galactose, as by treatment with dilute sulfuric acid. The galactose thus obtainable can be evaporated and recovered in the form of a syrup; or it may be fermented for the production of alcohol or other fermentation products; or it may be used as a source of mucic acid, by treatment with nitric acid.

The galactan liquor obtained as above described may itself be subjected to fermentation, after such preliminary concentration or purification or other treatment as will adapt it for the desired fermentation operation.

From the foregoing description it will be evident that the process of the present invention may be practised in various ways, and with various types of apparatus, both as regards the leaching or extracting operation, and as regards the subsequent chemical digestion for the conversion of the extracted wood into chemical pulp. Whatever the particular method of leaching or extraction, and of chemical digestion, the valuable soluble constituents of the larch will be more or less completely removed and thereby recovered in a valuable condition well adapted for further use or treatment; while the extracted wood will be converted into chemical pulp with corresponding advantage both to the pulp-making operation and to the resulting waste liquor; inasmuch as the constituents which would otherwise be present in the waste liquor have been preliminarily removed in a substantially unchanged and unmodified condition preliminary to the digestion operation.

Having thus described my invention, what I claim is:

1. The method of recovering galactan and other soluble constituents from the wood of the western larch, and of producing paper pulp therefrom by a chemical pulp making process, which comprises chipping, shredding, or otherwise finely comminuting the wood, leaching or extracting the comminuted wood and thereby producing a solution of the galactan and other soluble constituents, and subjecting the extracted wood to a chemical pulp-making operation whereby the pulp-making process is promoted and the amount of chemicals required therein is materially reduced by the preliminary removal of the soluble constituents, and such constituents are obtained uncontaminated with the chemicals employed; substantially as described.

2. The method of recovering galactan and other soluble constituents from the wood of the western larch, and of producing paper pulp therefrom by a chemical pulp making process, which comprises chipping, shredding, or otherwise finely comminuting the wood, leaching or extracting the comminuted wood with hot water or an aqueous solvent and thereby producing a solution of the galactan and other soluble constituents, and subjecting the extracted wood to a chemical pulp-making operation whereby the pulp-making process is promoted and the amount of chemicals required therein is materially reduced by the preliminary removal of the soluble constituents, and such constituents are obtained uncontaminated with the chemicals employed; substantially as described.

3. The method of recovering galactan and other soluble constituents from the wood of the western larch, and of producing paper pulp therefrom by a chemical pulp making process, which comprises chipping, shredding, or otherwise finely comminuting the wood, subjecting the comminuted wood to a series of leaching or extraction operations, thereby progressively removing the galactan and other soluble constituents and producing solutions thereof, and subjecting the extracted wood to a chemical pulp-making operation whereby the pulp-making process is promoted and the amount of chemicals required therein is materially reduced by the preliminary removal of the soluble constituents, and such constituents are obtained uncontaminated with the chemicals employed; substantially as described.

4. The method of recovering galactan and other soluble constituents from the wood of the western larch, and of producing paper pulp therefrom, which comprises chipping, shredding, or otherwise finely comminuting the wood, subjecting the comminuted wood to systematic extraction on the counter-current principle by bringing fresh solvent into contact with the partially extracted wood and bringing the more saturated solvent into contact with the fresh wood and thereby producing a solution of the galactan and other soluble constituents and freeing the wood therefrom, and subjecting the extracted wood to a pulp-making operation; substantially as described.

5. The method of recovering galactan and other soluble constituents from the wood of the western larch, and of producing paper pulp therefrom by a chemical pulp making process, which comprises chipping, shredding, or otherwise finely comminuting the wood, introducing the comminuted wood into a pulp digester and subjecting the same therein to a leaching and extraction operation with a hot water or an aqueous solvent and thereby producing a solution of the galactan and other soluble constituents and leaving the comminuted wood in a moist and heated condition, and subjecting the hot moist extracted wood to a chemical pulp-making operation whereby the pulp-making process is promoted and the amount of chemicals required therein is materially reduced by the preliminary removal of the soluble constituents, and such constituents are obtained uncontaminated with the chemicals employed; substantially as described.

6. The method of recovering galactan and other soluble constituents from the wood of the western larch, and of producing paper pulp therefrom, which comprises chipping, shredding, or otherwise finely comminuting the wood, leaching or extracting the comminuted wood and thereby producing a solution of the galactan and other soluble constituents, and subjecting the extracted wood to a sulfite pulp digestion operation and thereby producing sulfite pulp and a waste sulfite liquor containing the remainder of the soluble constituents of the wood; substantially as described.

In testimony whereof I affix my signature.

HOWARD F. WEISS.